(12) United States Patent  (10) Patent No.: US 8,001,143 B1
Gupta et al.  (45) Date of Patent: Aug. 16, 2011

(54) AGGREGATING CHARACTERISTIC INFORMATION FOR DIGITAL CONTENT

(75) Inventors: Pankaj Gupta, Noida (IN); Swapnil Shrivastava, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 976 days.

(21) Appl. No.: 11/444,642

(22) Filed: May 31, 2006

(51) Int. Cl.
G06F 17/30 (2006.01)
G06F 3/00 (2006.01)
G09G 5/00 (2006.01)

(52) U.S. Cl. ........ 707/770; 707/913; 715/722; 715/756; 345/614

(58) Field of Classification Search .................. 707/1–3, 707/7, 10, 100, 102, 104.1, 200, 636, 688, 707/694, 732, 758, 781, 783–785, 804, 821–822, 707/825–827, 912, 923, 770, 913–917; 715/201–202, 206, 704, 716, 719, 722–723, 715/727–728, 730, 732–733, 737–756, 761–762, 715/844, 720; 725/101, 37; 345/586, 613–614, 345/634, 650, 661, 676
See application file for complete search history.

(56) References Cited

U.S. PATENT DOCUMENTS

| | | | |
|---|---|---|---|
| 5,054,360 A | 10/1991 | Lisle et al. | |
| 5,883,804 A | 3/1999 | Christensen | |
| 6,094,671 A * | 7/2000 | Chase et al. | 709/201 |
| 6,389,541 B1 | 5/2002 | Patterson | |
| 6,523,069 B1 * | 2/2003 | Luczycki et al. | 709/249 |
| 6,553,412 B1 * | 4/2003 | Kloba et al. | 709/219 |
| 6,834,195 B2 * | 12/2004 | Brandenberg et al. | 455/456.3 |
| 6,892,193 B2 * | 5/2005 | Bolle et al. | 706/20 |
| 6,961,714 B1 * | 11/2005 | LeVine | 705/51 |
| 7,308,413 B1 | 12/2007 | Tota et al. | |
| 7,797,352 B1 | 9/2010 | Hopwood et al. | |
| 2002/0023058 A1 | 2/2002 | Taniguchi et al. | |
| 2002/0033844 A1 * | 3/2002 | Levy et al. | 345/744 |
| 2002/0069218 A1 | 6/2002 | Sull et al. | |
| 2002/0092019 A1 * | 7/2002 | Marcus | 725/37 |
| 2002/0163532 A1 | 11/2002 | Thomas et al. | |
| 2003/0004966 A1 * | 1/2003 | Bolle et al. | 707/104.1 |
| 2003/0028896 A1 * | 2/2003 | Swart et al. | 725/127 |
| 2003/0128880 A1 * | 7/2003 | Akimoto et al. | 382/236 |
| 2003/0135464 A1 * | 7/2003 | Mourad et al. | 705/50 |
| 2003/0203713 A1 | 10/2003 | Onishi | |
| 2004/0002993 A1 * | 1/2004 | Toussaint et al. | 707/104.1 |

(Continued)

FOREIGN PATENT DOCUMENTS

WO WO 01/35290 * 5/2001

(Continued)

OTHER PUBLICATIONS

Peter K. Doengesa et al. "MPEG-E:Audio/video and synthetic graphics/audio for mixed media",Signal Processing: Image Communication 9 (1997) 433-463.*

(Continued)

*Primary Examiner* — Srirama Channavajjala
(74) *Attorney, Agent, or Firm* — Schwegman, Lundberg & Woessner, P.A.

(57) ABSTRACT

A method includes receiving characteristic information pertaining to respective portions of content from each of a plurality of users. Aggregate characteristic information is updated based on the received characteristic information. The aggregate characteristic information is communicated to a user to assist the user in navigation of the content.

21 Claims, 9 Drawing Sheets

U.S. PATENT DOCUMENTS

| | | | |
|---|---|---|---|
| 2004/0128317 | A1 | 7/2004 | Sull et al. |
| 2005/0015713 | A1* | 1/2005 | Plastina et al. ............. 715/500.1 |
| 2005/0122960 | A1* | 6/2005 | Khan ............................ 370/352 |
| 2005/0165795 | A1* | 7/2005 | Myka et al. ................... 707/100 |
| 2005/0203927 | A1 | 9/2005 | Sull et al. |
| 2005/0283791 | A1 | 12/2005 | McCarthy et al. |
| 2005/0288991 | A1 | 12/2005 | Hubbard et al. |
| 2006/0059526 | A1 | 3/2006 | Poslinski |
| 2006/0078292 | A1* | 4/2006 | Huang et al. ................... 386/68 |
| 2006/0092282 | A1 | 5/2006 | Herley et al. |
| 2006/0121987 | A1* | 6/2006 | Bortnik et al. .................. 463/42 |
| 2006/0190616 | A1* | 8/2006 | Mayerhofer et al. ......... 709/231 |
| 2007/0038931 | A1* | 2/2007 | Allaire et al. ................. 715/526 |
| 2007/0078898 | A1 | 4/2007 | Hayashi et al. |
| 2007/0106660 | A1 | 5/2007 | Stern et al. |
| 2007/0214485 | A1* | 9/2007 | Bodin et al. .................. 725/101 |
| 2008/0056297 | A1* | 3/2008 | Gaur et al. .................... 370/447 |
| 2008/0306936 | A1 | 12/2008 | Ho et al. |

FOREIGN PATENT DOCUMENTS

| | | | |
|---|---|---|---|
| WO | WO 0219720 | * | 3/2002 |
| WO | WO-2005025217 | A1 | 3/2005 |
| WO | WO 2005/125190 | * | 12/2005 |

OTHER PUBLICATIONS

Pedro Almeida, et al. "SInBAD—A Digital Library to Aggregate Multimedia Documents",Proceedings of the Advanced International Conference on Telecommunications and International Conference on Internet and Web Applications and Services (AICT/ICIW 2006) , 6 Pages.*

"How to Create and Use Flash Video Metadata to Add Cue-Points With flvtool2", [online]. [archived on Dec. 8, 2006; retrieved on Jan. 6, 2007]. Retrieved from the Internet: <URL: http://www.ioncannon.net/web-design/109/metadata-cuepoint-flash-video-flvtool/, 6 pgs.

Moorer, J. A., "The Digital Audio Processing Station: A New Concept in Audio Postproduction",*J. Audio Eng. Soc.*, 34(6), (Jun. 1986), 454-463.

Smith, J. O., "Unit Generator Implementation on the Next DSP Chip", *Proceedings of the International Computer Music Conference*, 1989, 303-306.

Adobe, "Get comments quickly with clip notes", www.studio.adobe.com.

IMDB, "The vote average for film X should be Y", http://msn-uk.imdb.com/help/show_leaf?voteaverage, (Observed Apr. 27, 2006),2 pgs.

"U.S. Appl. No. 11/669,002, Final Office Action mailed Jul. 9, 2009", 20 pgs.

"U.S. Appl. No. 11/669,002, Non-Final Office Action mailed Jan. 23, 2009", 17 pgs.

"U.S. Appl. No. 11/669,002, Response filed Apr. 21, 2009 to Non Final Office Action mailed Jan. 23, 2009", 11 pgs.

"U.S. Appl. No. 11/820,586, Response filed Aug. 21, 2009 to Restriction Requirement mailed Jul. 23, 2009", 7 pgs.

"U.S. Appl. No. 11/820,586, Restriction Requirement mailed Jul. 23, 2009", 6 pgs.

"Star Wars", http://sebastianheycke.de/a_starwars/movie2.html, (Downloaded Sep. 10, 2007).

Girgensohn, A. , et al., "Facilitating Video Access by Visualizing Automatic Analysis", *Human-Computer Interaction INTERACT '99, IOS Press*, (1999),205-212.

Lee, Hyowon , "The Fischlar Digital Video Recording, Analysis and Browsing System",*Proceedings of RIAO '2000: ContentBased Multimedia Information Access*, Paris, France.,(Apr. 12-14, 2000),1-10.

"U.S. Appl. No. 11/669,002, Response filed Dec. 9, 2009 to Final Office Action mailed Jul. 9, 2009", 10 pgs.

"U.S. Appl. No. 11/820,586, Non-Final Office Action mailed Nov. 20, 2009", 10 pgs.

"U.S. Appl. No. 11/669,002, Non-Final Office Action mailed Apr. 7, 2010", 19.

"U.S. Appl. No. 11/713,959 SIDS", 4.

"U.S. Appl. No. 11/820,586, Response filed Feb. 10, 2010 to Non Final Office Action mailed Nov. 20, 2009", 8 pgs.

"U.S. Appl. No. 11/669,002, Response filed Jul. 6, 2010 to Non Final Office Action mailed Apr. 7, 2010", 11 pgs.

"U.S. Appl. No. 11/820,586, Notice of Allowance mailed May 28, 2010", 12 pgs.

Minerva Yeung, et al., "Extracting story units from long programs for video browsing and navigation", IEEE,(Jun. 17-23, 1996),296-305.

O'Connor, et al., "News story segmentation in the Fischlar video indexing system", Vo1.3, IEEE,(2001),418-421.

"U.S. Appl. No. 11/669,002, Final Office Action mailed Oct. 8, 2010", 17 pgs.

"U.S. Appl. No. 11/669,002, Non Final Office Action mailed Mar. 22, 2011", 20 pgs.

"U.S. Appl. No. 11/669,002, Response filed Jan. 10, 2011 to Final Office Action mailed Oct. 8, 2010", 11 pgs.

"U.S. Appl. No. 12/875,276, Final Office Action mailed Mar. 28, 2011", 10 pgs.

"U.S. Appl. No. 12/875,276, Non-Final Office Action mailed Oct. 15, 2010", 12 pgs.

"U.S. Appl. No. 12/875,276, Response filed Jan. 18, 2011 to Non-Final Office Action mailed Oct. 15, 2011", 11 pgs.

* cited by examiner

AGGREGATING CHARACTERISTIC INFORMATION FOR DIGITAL CONTENT

FIELD

This application relates to a method and system to process digital content and, in an example embodiment, to aggregate user-generated characteristic information pertaining to digital content.

BACKGROUND

As digital content, (e.g., picture, audio and video content) becomes ubiquitous, the storage, consumption and meaningful archiving of an ever increasing volume of digital content threatens to overwhelm users. Specifically, with respect to the consumption (e.g., viewing or listening) of digital media content, users are being forced to become more selective with respect media that they consume.

A number of technologies are currently available that facilitate the archiving and storage of digital content in a manner that enables users conveniently to locate media of interest at a particular time. For example, United States Patent Application Publication No. US2002/0069218 proposes methods to enable users to add bookmarks to multimedia files, such as movies and audio files. These multimedia bookmarks facilitate the searching of portions or segments of multimedia files. United States Patent Application Publication No. US2004/0128317 also proposes methods and apparatus for viewing, browsing, navigating and book marking videos and displaying images. Content characteristics, for a number of video programs that have been recorded, are locally generated. These content characteristics are then displayed, thus enabling users to select a video of interest, as well as a segment of interest within a selected video. Content characteristics may be generated according to user preference, and may comprise at least one key frame image, or a number of images displayed in the form of an animated image or a video stream.

United States Patent Application Publication No. US2002/0163532 discusses a system for bookmarking an area of interest within stored video content. As a viewer is watching a video, and finds an area of interest, the user can bookmark the particular segment of a video, and then return to that segment with relative simplicity. This can be accomplished by pressing a button, clicking a mouse or otherwise sending a signal to a device for marking a particular location of the video of interest. Frame identifiers can also be used to select a desired video from an index, and to retrieve the video from a medium containing multiple videos.

BRIEF DESCRIPTION OF DRAWINGS

Some embodiments are illustrated by way of example and not limitation in the figures of the accompanying drawings in which.

DETAILED DESCRIPTION

Figure 1:
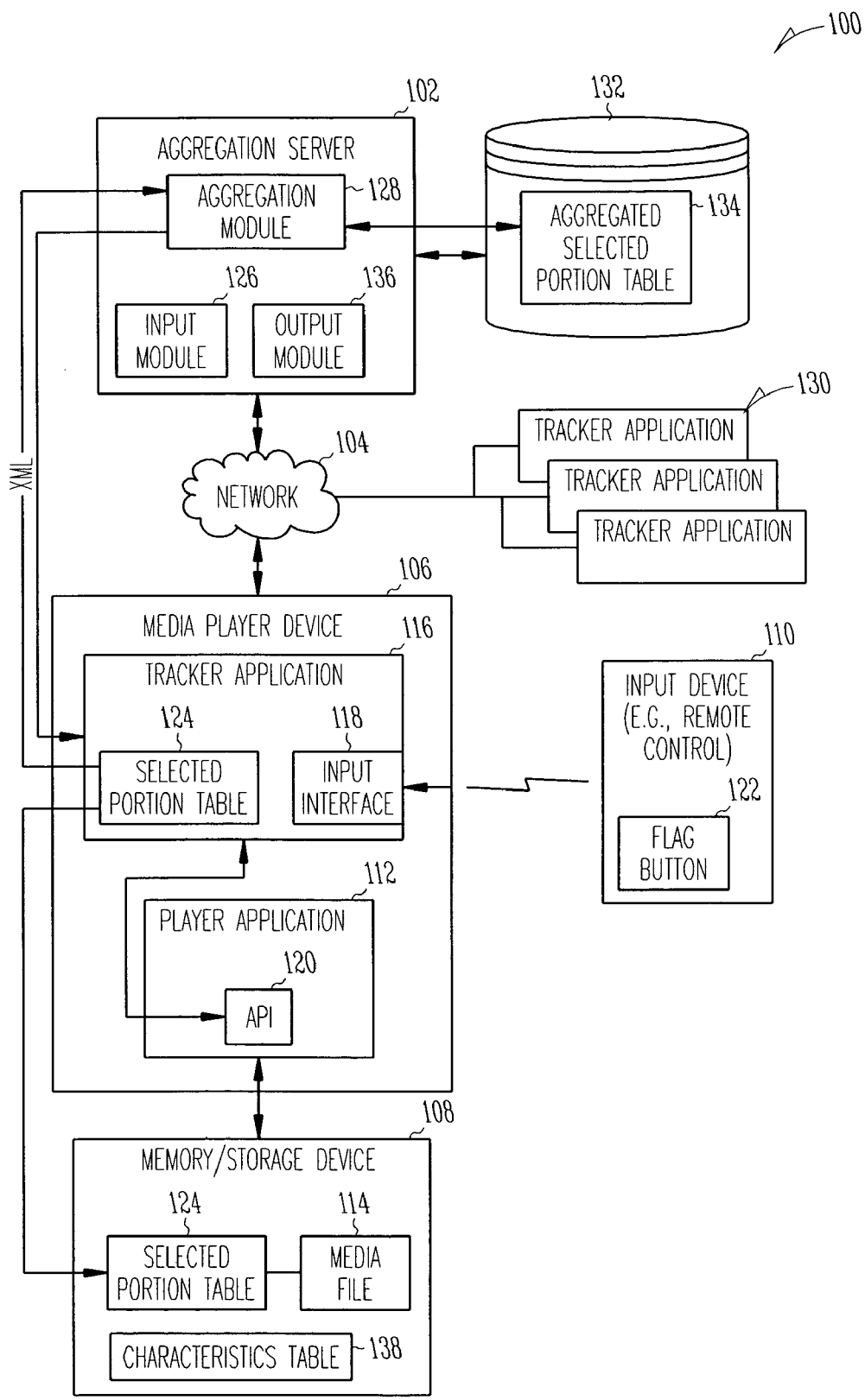
FIG. 1 is a block diagram illustrating a system, according to an example embodiment, to facilitate gathering, processing and utilization of characteristic information, from a number of users, with respect to a particular item of digital content.

In the following description, for purposes of explanation, numerous specific details are set forth in order to provide a thorough understanding of some example embodiments. It will be evident, however, to one skilled in the art that the present invention may be practiced without these specific details.

Whether a particular portion of digital content is of interest to a particular user may, of course, be defined in terms of human context. Pixel and audio data in and of itself may have no meaning, and whether a particular portion of data holds more or less appeal to a user may be highly subjective. Accordingly, algorithms that utilize image/video pixel data and audio samples values in an attempt to identify portions of digital content that are of interest to a human user may fall short in considering subjective factors.

While assessing digital content (e.g., a digital image, video, audio or document content), a user may find certain parts of the content more interesting than others based on any one of a number of factors. In one embodiment, there is below described a method and a system to enable a user to mark, select, tag and/or designate digital content as being of interest (or exhibiting some other user-perceived characteristic) while accessing (e.g., viewing or listening to) the digital content.

The received characteristic information, received over time from one or more users, may then be aggregated, so as to provide users with an aggregate indication of parts (or portions) of the digital content that are perceived as having a specific characteristic. For example, the received characteristic information, received from one or more users, may be utilized to identify "highlights" or favorite portions within a digital content item (e.g. highlights within a digital video). The received characteristic information may be used to update (e.g., generate or modify) aggregate characteristic information pertaining to a particular digital content item. Where the received characteristic information is capable of mathematical manipulation, the updating of the aggregate characteristic information may employ any one of a number of mathematical operations or functions (e.g., summing, aggregating etc.).

In an example embodiment, the aggregate characteristic information may then be communicated to one or more users to assist, for example, in the navigation of the relevant digital content item. For example, the aggregate characteristic information may be presented to a user in such a way so as to enable the user conveniently to identify parts (or portions) of the digital content item that a particular user, or group of users, found to be of interest or identified as having a particular characteristic.

In various embodiments, the aggregate characteristic information may be generated or selected based on certain criteria specified by an accessing user. The aggregate characteristic information may, in one embodiment, be generated or selected based on criteria pertaining to other users that submitted information pertaining to a specific item of digital content. Merely for example, a viewer watching a digital video may request aggregate characteristic information generated based on information received from viewers of a particular demographic (e.g., between the ages of 20 and 30 years). In this way, the aggregate characteristic information may identify user-perceived characteristics (e.g., favorite portions) as reflected in characteristic information provided by a particular user demographic. The aggregate characteristic information may be generated based on information received, relating to particular piece of digital content, from any one of a number of user demographics. Accordingly, a user may specify any one of a number of demographic criteria (e.g., age, geographic location, gender, income, nationality, education, homeownership, marital status, mobility, etc).

The aggregate characteristic information may also be presented to a user so as to enable the user conveniently to navigate to a portion of the digital content item exhibiting a predetermined characteristic. For example, a graph providing a visual depiction of a number of instances of an identified characteristic (e.g., a favorite scene), plotted against time or a sequence number (e.g., a frame number), may be presented with respect to a digital content item. By navigating the displayed graph (or other visual depiction), a user may conveniently be able to navigate to a particular portion or section of the digital content item that exhibits a predetermined characteristic, based on the aggregate input from a number of users. Of course, any number of mechanisms may be provided that utilize the aggregate characteristic information to assist a user to navigate to a portion of a digital content item that may exhibit a predetermined characteristic, as reflected by the aggregate characteristic information.

FIG. 1 is a block diagram illustrating a system 100, according to an example embodiment, to facilitate gathering, processing and utilization of characteristic information with respect to a particular item of digital content. In the example embodiment, the gathered and processed characteristic information is aggregated and then made available to users, accessing the relevant digital content item, so as to assist the users in identifying characteristics thereof. The received and processed characteristic information may also be presented to an accessing user in such as a manner so as to assist the user in navigating to a portion of the digital content item that exhibits a specific characteristic of interest to the user.

The system 100 includes an aggregation server 102 that is coupled via a network 104 (e.g., the Internet or other Wide Area Network (WAN)) to one or more media player devices 106 that are utilized by users to access digital content items. The media player device 106 may physically reside at an end user location, or may be a network-based device (e.g., a network-based PVR) that resides at a location remote from an end user, and that is accessible by an end user via a network. The media player device 106 may be any device that operates to present (e.g., display or reproduce) digital content to a user. Examples of media player devices may include a Set Top Box (STB), a Personal Video Recorder (PVR), a Digital Video Recorder (DVR), a Media Center personal computer, an audio player (e.g., a MP3 player), a portable media player device (e.g., portable video player), cellular or mobile telephone, a Personal Digital Assistant (PDA) or an electronic book (ebook) device. In various embodiments, the functionality to present digital content may be incorporated within a larger, multi-purpose system, such as a computer system (e.g. a server computer, a personal computer, a portable or laptop computer, etc.).

The media player device 106 has access to a local storage 108 (e.g., a disk drive or a solid state storage device) from which it may retrieve and process digital content items. The media player device 106 may operationally be controlled by (or at least received input from) an input device 110, which may be integrated within the media player device 106 or may be a separate device that is communicatively coupled to the media player device 106. For example, where the media player device 106 is a set-top box or a personal video recorder, the input device 110 may be a remote control device. Alternatively, where the media player device 106 is a personal computer, the input device 110 may be a keyboard, mouse, display screen or any combination of such devices, for example.

Dealing specifically with the media player device 106, a hosted player application 112 operationally accesses digital content, in the example form of a media file 114, stored within the local storage 108, retrieves the media file 114, and may then process the media file 114 for presentation (e.g., visual or audio presentation) to a user. The player application 112 may, for example, be an audio application (e.g., the iTunes® application of Apple Computer Inc. of Cupertino, Calif.) or a multimedia application (e.g., the Flash® Player of Adobe Systems Incorporated of San Jose, Calif. or the Windows Media Player of Microsoft Corporation of Redmond, Wash. State).

The media player device 106 also hosts a tracker application 116 that includes an input interface 118 to receive input information (e.g., characteristic selection or ranking information) provided to the media player device 106 from the input device 110. For example, the input device 110 may include, or present, a select mechanism (e.g., a select button 122) that is user selectable to receive, from the user, a characteristic selection indication that is then communicated from the input device 110, to the media player device 106, and, via the input interface 118 to the tracker application 116.

The tracker application 116 accesses the player application 112 (e.g., via an API 120 exposed by the player application 112), and is able to receive information related to content being presented by the player application 112 at a particular instance in time. Accordingly, the tracker application 116 is able to determine, for example, a portion of content (e.g., a frame or frames of a digital video) being presented by the player application 112 at a particular instance, and to correlate the presented content with a characteristic selection event, identified based on the received selection information. In this manner, the tracker application 116 is able to identify a portion (e.g., a video frame) of content as having been selected, utilizing the received selection information from the input device 110, and content identification information (e.g., a frame number) received from the player application 112.

The tracker application 116 constructs a selected portion table 124 to record the correlation between a characteristic selection event and a portion of digital content item (e.g., the media file 114). This selected portion table 124 may be constructed over a particular playback period, and then stored by the tracker application 116 in the local storage 108, in association with the media file 114.

The tracker application 116, in an example embodiment, also communicates the selected portion table 124, together with an identifier identifying the media file 114, to the aggregation server 102. Specifically, the aggregation server 102 includes an input module 126 via which the selected portion table 124 is received and communicated to an aggregation module 128. The aggregation module 128 operates to update (e.g., generate or modify) aggregate characteristic information, pertaining to a particular digital content item (e.g., the media file 114). To this end, the aggregation module 128 may receive selected portion tables 124 (or other selection information pertaining to a particular content item) from multiple other tracker applications 130, which may be hosted on media player devices at a number of end user locations. The generation or modification of aggregate characteristic information by the aggregation module 128 may be performed, in one example embodiment, responsive to receipt of characteristic selection information from a particular tracker application. In another embodiment, the generation or modification of aggregate characteristic information may be performed responsive to receipt of a request for aggregate characteristic information, the aggregation in this case being performed utilizing criteria or parameters included within such a request.

The updating of aggregate characteristic information pertaining to a data content item may include performing mathematical operations, based on the received characteristic selection (or "tagging") information, with respect to multiple portions of the digital content item. For example, where the digital content item is a media file 114 (e.g., a digital video), the aggregation module 128 may count or sum selection events with respect to frames constituting the digital video, each of the selection events for example identifying a certain characteristic of the video frame (e.g., selection of the particular video frame as a favorite, as being unsuitable for viewers under the age of 18, as depicting violence, etc.).

The aggregate characteristic information is then stored by the aggregation module 128 in storage 132, accessible by the aggregation server 102, as an aggregated selection portion table 134.

The selection information communicated from the tracker application 116 to the aggregation module 128 may include media identification information, identifying a digital content item to which the selection information pertains. In addition to identifying a particular digital content item, the information communicated to the aggregation module 128 by the tracker application 116 may include an identifier for a user that made the selection or, in another embodiment, demographic information pertaining to the relevant user. In one embodiment, where a user identifier is communicated to the aggregation module 128, the aggregation server 102 may store information, including demographic information, pertaining to users. The user identifier communicated with the selection information may enable the aggregation module 128 to identify the user from which the selection information originated. In the further embodiment, in which anonymous demographic information is communicated to the aggregation module 128, this demographic information may be locally stored at the media player device 106 (e.g., in the local storage 108), and communicated in anonymously together with the characteristic selection information.

The demographic information (e.g., determined at the aggregation server 102 or received from the media player device 106) may further the stored in association with the characteristic selection information (e.g., in the aggregated selected portion table 134), so as to facilitate the provision of aggregated selection information in a demographically filtered manner by the aggregation module 128.

The aggregation server 102 is also shown to include an output module 136 via which the aggregation server 102 may communicate aggregate characteristic information, for example retrieved from the aggregated selection portion table 134, to a user to assist the user in the navigation or other processing or use of a digital content item. For example, a user, having selected the media file 114 for display on a television device by the media player device 106, may request that aggregate characteristic information, retrieved from the table 134, be presented in conjunction with the presentation of the media file 114 so as to enable the user to identify portions (e.g., frames or collections of frames) that exhibit predetermined characteristics (e.g., have been identified as favorites, depicting graphic violence, etc.). The aggregation server 102, via the output module 136, may communicate the aggregate characteristic information for use by a user in conjunction with the playback of the media file 114. For example, the media file 114 may constitute a sequence of portions (e.g., a sequence of video frames) presentable to the user over a period of time as a playback. The media player device 106 may present playback of the media file 114 to a user in conjunction with the received aggregate characteristic information. Further, during the playback period, the tracker application 116 may, as described above, receive input from the input device 110 that initiates a navigation event, with respect to the playback of the media file 114, based on the aggregate characteristic information. Specifically, the navigation input may relate to (or be based on) the presented aggregate characteristic information, and may enable navigation to a location within the media file 114 based on the navigation input.

In a further embodiment, (e.g., where the media player device 106 is a personal computer), the input device 110 may comprise the combination of a display (e.g., an LCD display), a keyboard and a mouse. In this scenario, the tracker application 116 may present an interface via the display. The interface may enable the user to provide further information in addition to characteristic selection information. For example, the tracker application 116 may generate a user interface that allows the user to identify (e.g., select) a characteristic to which the selection event pertains. The user interface may include a menu of characteristics (e.g., favorite, graphic violence, bad language, action, humor, etc.) that may be user selectable. The selected characteristic would then be associated with the characteristic selection event pertaining to a portion of a digital content item. In yet a further embodiment, the tracker application 116 may enable a user to define (e.g., name) characteristics to be associated with selection events. These characteristics (e.g., as predetermined by the tracker application 116 or user created by a user of the tracker application 116) may be stored in a characteristic table 138, stored in the local storage 108 and accessible by the tracker application 116.

In another embodiment, as opposed to a simple characteristic selection event, resulting in the receiving and/or generation of characteristic selection information by the tracker application 116, the input device 110 may enable a user to provide ranking (or degree) information, which represents a relative degree to which the user may perceive the characteristic as being present in a particular portion of the digital content item. For example, where the identified characteristic is "favorite", ranking information may be communicated from the input device 110 (e.g., a ranking of 1-3, with a ranking of 3 indicating a higher degree of favor with the user). Ranking or degree information may of course be associated with a characteristic selection event pertaining to any one of a number of types of characteristics. For example, where the selection event is to identify a portion of a digital content item as depicting graphic violence, the degree of graphic violence may be represented by degree information, with a ranking of "1" indicating a lesser degree of graphic violence than a ranking of "5". To this end, the input device 110 may also display a ranking input mechanism (not shown) (e.g., a menu presented on the screen of a display) that facilitates convenient user input of the degree information to the tracker application 166. This degree information may then also be included within the selected portion table 124, and communicated to the aggregation server 102 for inclusion within the aggregated selected portion table 134.

With respect to different types of digital content items that may be presented by the player application 112, it will be appreciated that, in various embodiments, such digital content items may include digital video files, digital audio files, digital images or electronic documents, merely for example. As such, the player application 112 may in various embodiments constitute a multimedia player application, a video player application, a digital photograph application, a digital image generation/processing application, an electronic document generation, editing or presenting application etc.

In a further embodiment, the tracker application and the player application may be hosted applications, and may hosted as part of (or separate from) the aggregation server 102. In this embodiment, the output module 136 may be configured to present the playback to the user (e.g., as generated by the player application 112) and the input module 126 may be configured to receive navigation and tag information, the tag information indicating user selection of at least one part of the sequence of content parts during the playback. The input module 126, in this example embodiment, may also be configured to receive a navigation input, the navigation input to be provided to the hosted player application 112. The hosted player application 112 may utilize the navigation input (which may itself be based on the aggregate tag information) to navigate to a location within the content. In short, the various operations described above as being performed by the tracker application and the player application, as hosted on the media player device 106, may be performed by hosted tracker and player applications accessible via a network connected device.

Figure 2:
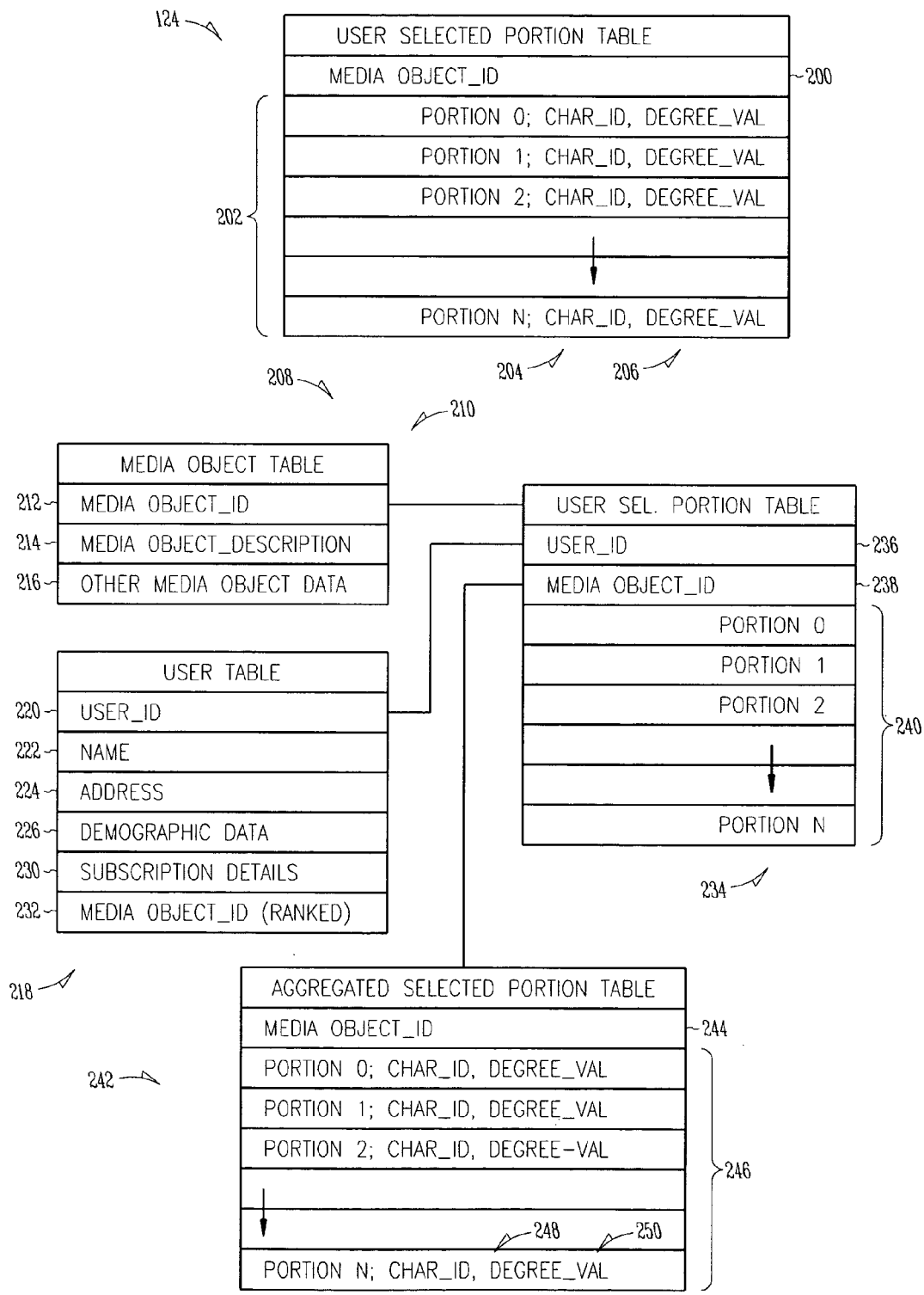
FIG. 2 is an entity relationship diagram, illustrating various data structures in the example form of tables, which may be maintained within the system, according to an example embodiment.

FIG. 2 is an entity relationship diagram, illustrating various data structures, in the example form of tables, which may be maintained within the system 100, according to an example embodiment. An example user selected portions table 124 may be generated by the tracker application 116. Each entry in the table 124 may include a media object identifier 200, identifying a media object to which the record pertains, as well as a number of portion identifiers 202, which are examples of characteristic selection information pertaining to portions of a digital content item. Each of the characteristic portion identifiers 202 may identify, for example, a video frame, an audio time sequence number, a collection of pixels, etc. Further, each of the portion identifiers may be associated with a characteristic identifier 204 identifying a characteristic to which the selection information pertains (e.g., a favorite, violence, action characteristic, etc.), and a degree identifier 206, indicating a user provided degree (e.g., numerical value) to which the relevant characteristic is deemed to be present in the selected portion of the digital content item.

FIG. 2 also illustrates a set 208 of tables that may be maintained within the storage 132 accessible by the aggregation server 102. The set 208 of tables include digital content information in the form of a media object table 210, which in turn includes records for each digital content item (e.g., media file) for which aggregated characteristic information is maintained. Specifically, each record within the table 210 includes an object identifier 212, object description 214 as well as additional object data 216.

A user table 218 maintains a record for each user (or other entity) that contributes characteristic information to the aggregation server 102. Specifically, each record may include a user identifier 220, name and address information 222 and 224, demographic data 226 (e.g., age, gender, etc.), subscription details 230 pertaining to a user subscription to aggregate characteristic data which is deliverable to the relevant user, and a collection of object identifiers, identifying digital content items regarding which the relevant user may have contributed characteristic information.

A user selected portion table 234 may, for each user for which a record exists within the user table 218, maintain a record for each digital content item (e.g., media object or file) regarding which the user has submitted characteristic information. Each record within the table 234 may include a user identifier 236, a media object identifier 238, and a collection of portion identifiers 240 identifying portions of the relevant digital content item regarding which the user has submitted characteristic information. In one embodiment, the table 234 may be a duplicate of the portion table 124, maintained at a user location. The aggregation module 128 and the tracker application 116 may include synchronization functionality so as to enable synchronization of the selected portion table 124 and the selected portion table 234.

The set 208 of tables further includes an aggregated selected portions table 242 into which characteristic information contained in multiple user selected portion tables 234 (or otherwise obtained) may be aggregated. As mentioned above, the aggregation of characteristic information may be achieved in any one of a number of ways, and using any one of a number of mathematical functions, such as summing, averaging, counting, etc. Accordingly, the aggregated selected portion table 242 is also shown to include a media object identifier 244, a set 246 of portion identifiers, each of which may further be stored in conjunction with a characteristic identifier 248 and a degree value 250. The degree value 250 may also be a function of an aggregation operation (e.g., a count of the number of users that have identified a particular portion as being a "favorite" portion of a digital content item).

Figure 3:
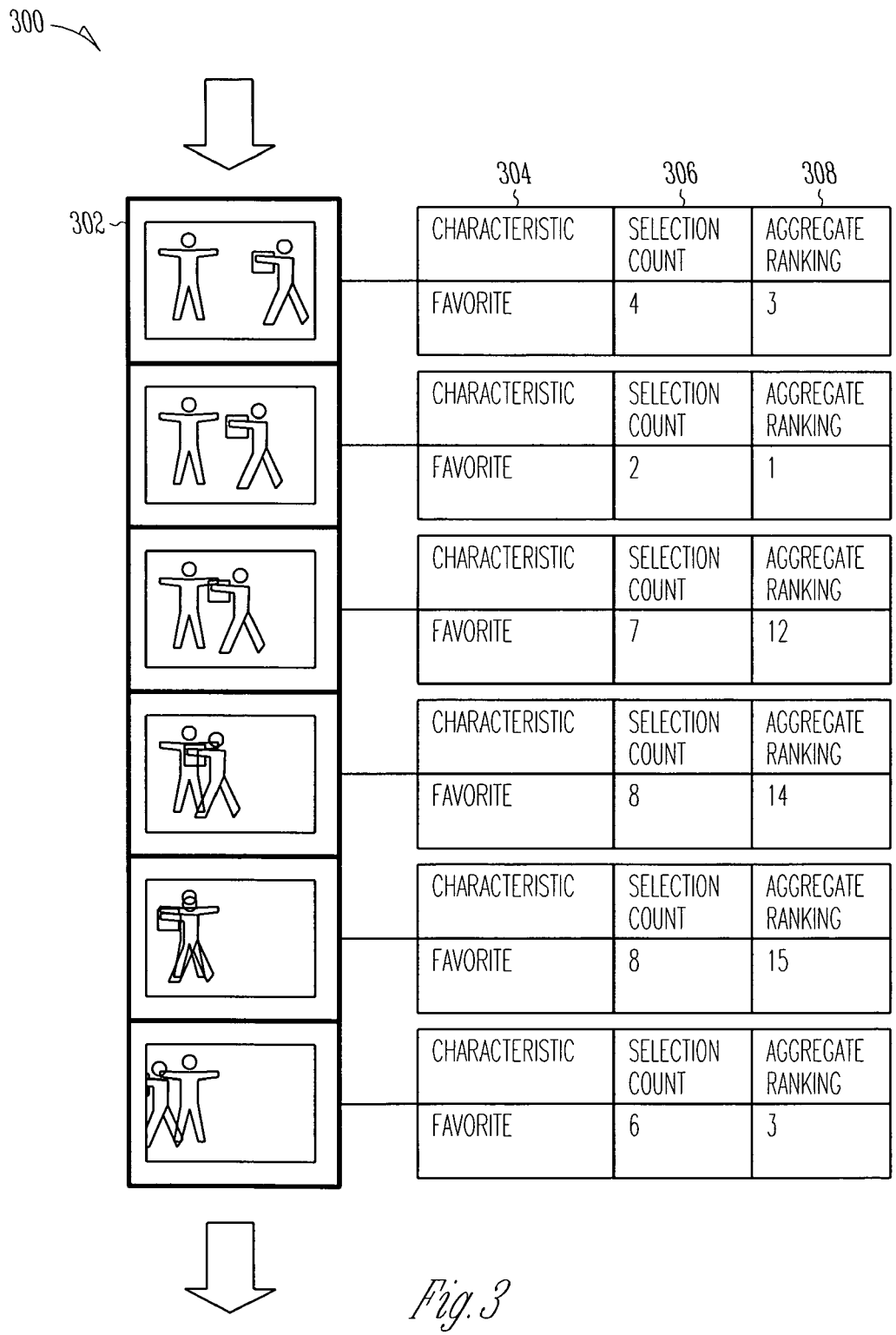
FIG. 3 is a conceptual representation of an association of characteristic and degree information with portions of a digital content item, according to an example embodiment.

FIG. 3 is a conceptual representation of the association of characteristic and degree information with portions of a digital content item, according to an example embodiment. Specifically, the example digital content item comprises a digital video 300 including a sequence of frames 302. Each frame 302 may have one or more characteristic identifiers 304 associated therewith, and each characteristic identifier 304 may be associated with one or more items of aggregate characteristic information. In the example embodiment, the characteristic 304 is a "favorites" characteristic, and the aggregate characteristic information includes a selection count value 306, indicating a count of a number of users that indicated the relevant frame as being a "favorite". Similarly, an aggregate ranking 308 may provide an average ranking, indicating an average ranking received from multiple users with respect to the relevant frame as a "favorite" frame.

Figure 4:
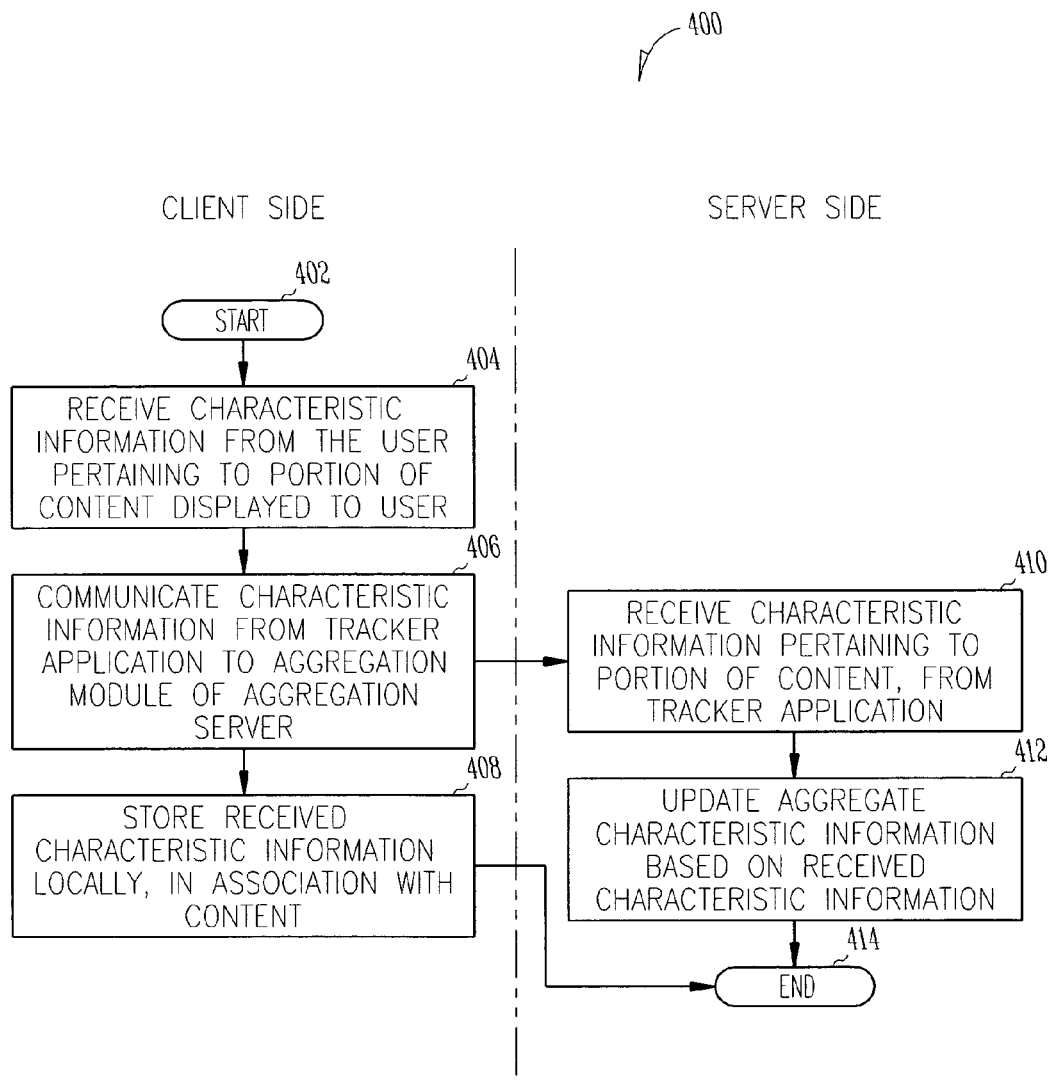
FIG. 4 is a flowchart illustrating a method, according to an example embodiment, to receive aggregate characteristic information pertaining to a digital content item.

FIG. 4 is a flowchart illustrating a method 400, according to an example embodiment, to receive characteristic information pertaining to a digital content item. The method 400 distinguishes between operations performed at a client application, and those performed at a server application. However, it will be appreciated that in other embodiments, such a distinction between client and the server application operations need not exist. For example, where the player application 112 and the tracker application 116 reside on a server-based machine, it will be appreciated that the distinction shown in FIG. 4 does not apply. Similarly, embodiments may be deployed in a peer-to-peer or "distributed" network system, in which case the differentiation between the client and server side operations would not be present.

The method 400 begins at 402, and proceeds to operation 404, with the receipt at the tracker application 116 of characteristic information from the user, the characteristic information for example being received via the input device 110 as described above. The receipt of the characteristic information may include presenting content to the user over a period of time (e.g., the player application 112 playing a digital video for viewing by a user) and receiving the characteristic selection information at the tracker application 116 at a particular instance and time. The tracker application 116 may then correlate the characteristic selection information with a particular portion of the content that is currently being presented by the player application 112.

The manner in which the characteristic selection information is associated with a particular portion of a digital content item will of course vary depending on the type of content item. For example, where the digital content item is a digital document, the correlation of the characteristic selection information with a particular portion of the digital document may require correlating a selection event with a portion of the document being viewed by a user at the time of the selection event.

At operation 406, the tracker application 116 communicates the characteristic information to the aggregation module 128 of the aggregation server 102. Further, at operation 408, the tracker application 116 stores the received characteristic information locally within the selected portion table 124, in association with a digital content item (e.g., the media file 114).

Turning now to the server-side operations, at operation 410, the aggregation module 128 receives the characteristic information, pertaining to the relevant portion of the digital content item, from the tracker application 116 and, at operation 412, proceeds to update aggregate characteristic information, for example maintained within the aggregate portion table 134. The updating of the aggregate characteristic information may include initial generation of aggregate characteristic information or the modifying of existing aggregate characteristic information, based on the received characteristic information. The updating of the aggregate characteristic information may further include performance of any one of a number of mathematical operations including implementing a count of discrete instances of characteristic information received from unique users, calculating an average ranking pertaining to a specific portion of a digital content item, etc.

Having updated the aggregate characteristic information at operation 412, the method 400 terminates at 414.

Figure 5:
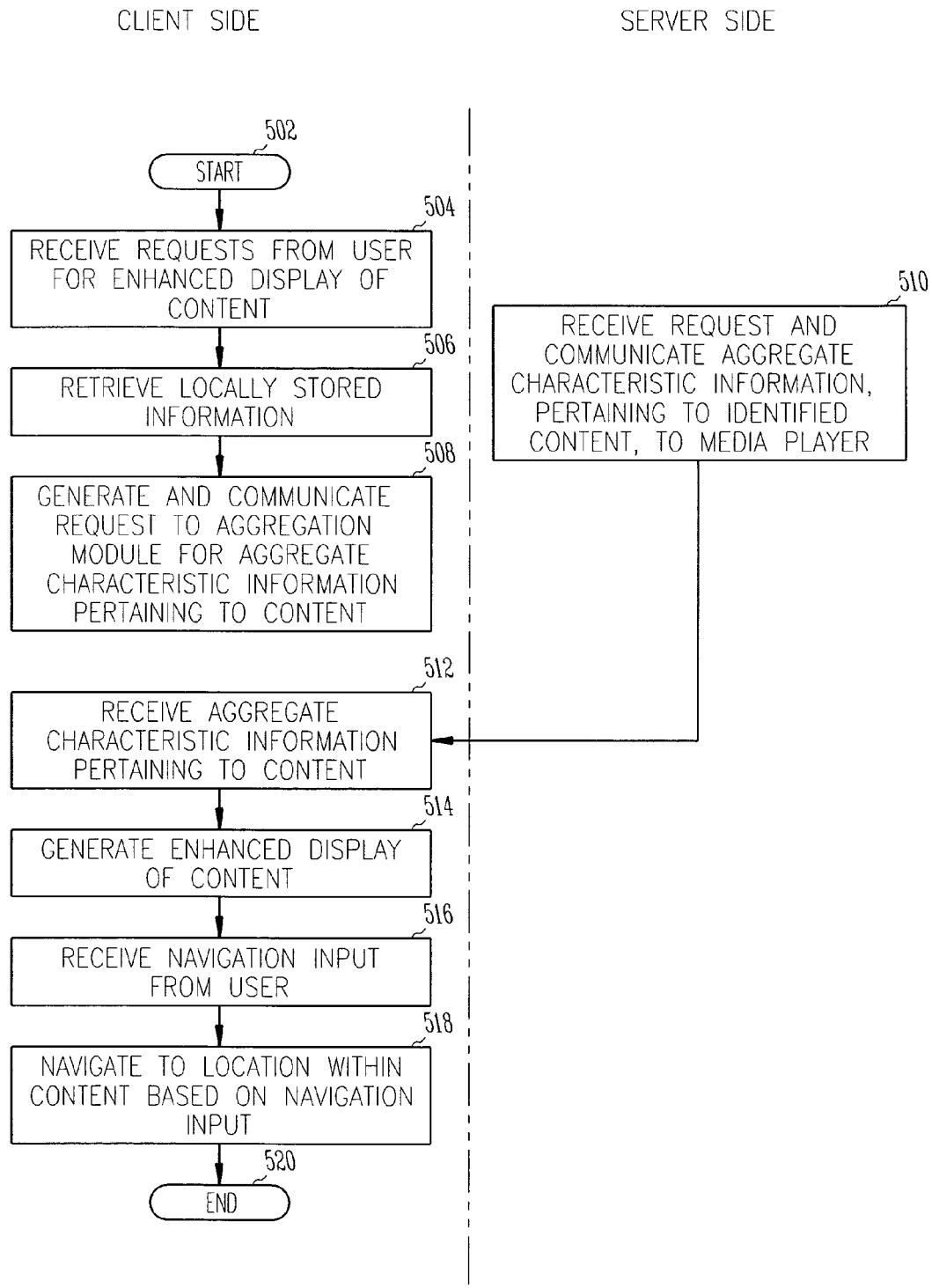
FIG. 5 is a flowchart illustrating a method, according to an example embodiment, to communicate aggregate characteristic information to a user to assist the user in processing (e.g., navigating) a digital content item.

FIG. 5 is a flowchart illustrating a method 500, according to an example embodiment, to communicate aggregate characteristic information to a user to assist the user in processing (e.g., navigating) a digital content item. The various operations of the method 500 are again shown in FIG. 5 to be divided between client side and server side operations. Again, in differently architectured systems, these distinctions may vary or fall away.

The method 500 commences at 502, and proceeds to operation 504 with the receipt, at a media player device 106, of a request from a user for the enhanced presentation (e.g., display) of a digital content item (e.g., a media file 114). The request for the enhanced presentation is, in the example embodiment, a request to supplement the presentation of the media file 114 with aggregate characteristic information representing aggregated characteristic indications with respect to portions of the media file 114. In other embodiments, the media player device 106 itself, without receiving a specific user request, may initiate the enhanced presentation of a digital content item (e.g., based on a pre-stored setting or a metadata or instructions associated with a digital content item).

At operation 506, the tracker application 116 may retrieve locally stored information, stored in the local storage 108 or remotely stored information, stored at a location accessible via the network 104. This retrieved information may include the media file 114, as well as the selected portions table 124. The retrieval of the stored information at operation 506 may be to enable presentation, to the user, of characteristic selection information generated by that user with respect to a particular media file 114, and also for the purposes of enabling a player application 112 to present the media file 114 to the user.

At operation 508, the tracker application 116 generates and communicates a request, via the network 104, to the aggregation module 128 for aggregate characteristic information, pertaining to a particular digital content item (e.g., the media file 114). This request may include an identifier for the media file 114, and identifier for the media player device 106 or a user of the media player device 106. Further, in one embodiment, the request from the user may specify certain demographic criteria or filters to be applied with respect to aggregate characteristic information to be utilized to enhance the display of the content. For example, the user may express an interest in only seeing aggregate characteristic information (e.g., aggregate favorites with respect to a particular digital movie) generated based on characteristic information received from male viewers between 20 and 30 years of age. In another example, a user may request aggregate characteristic information with respect to a children's movie, as received from female users between the ages of six and 12. To enable the provision of demographic criteria or filters to be included in that request, the tracker application 116 may, in one embodiment, generate a user interface (for example to be displayed on the input device 110) that enables a user conveniently to select define these additional criteria and filters.

At operation 510, the aggregation module 128 receives the request generated by the tracker application 116, and dynamically generates the aggregate characteristic information or gathers aggregate characteristic information, for example from the aggregate selected portion table 134 responsive to the request.

In one embodiment, the aggregation of the information to be delivered to the tracker application 116 is dynamically performed in near real time, responsive to receipt of the request and utilizing parameters and criteria defined by the request. For example, the request may include a request for aggregated information, pertaining to a particular digital content item and a further request that the aggregated information pertaining to a specific characteristic (e.g., favorite portions of a digital movie) as aggregated across a particular demographic (e.g., male viewers, residing in California, between the ages of 30 and 40 years).

In another embodiment, the aggregation of the information may be performed at the time of receipt of characteristic information from the tracker application 116. Accordingly, the updating of aggregate characteristic information, based on received characteristic information, may be performed, for example, at the time of receipt of the characteristic information (e.g., according to certain predefined parameters and characteristics), or responsive to receipt of a request for aggregated characteristic information from the tracker application 116.

Further, at operation 510, having generated and/or retrieved the aggregate characteristic information, the aggregation module 128 provides the aggregated characteristic information to the output module 136 of the aggregation server 102, which then communicates this aggregate characteristic information to a tracker application 116 to facilitate enhanced presentation of appropriate digital content item (e.g., to assist a user in navigating the relevant digital content item).

At operation 512, returning to the client side, the tracker application 116 receives the aggregate characteristic information pertaining to the relevant digital content item and, at operation 514, enhances the presentation (e.g., a video or audio playback) of the content utilizing the aggregate characteristic information. The presentation of a digital content item may be enhanced in any number of ways utilizing the aggregate characteristic information. Examples of such enhancements are discussed with respect to further figures below.

At operation 516, the tracker application 116 (or, in an alternative embodiment the player application 112), receives a navigation input from a user. For example, the navigation input may be received via the input device 110. At operation 518, responsive to the received navigation input, the tracker and/or the player application 116 or 112 navigate to a location within the digital content item. The method 500 then terminates at 520.

In the alternative embodiment, the methods 400 and 500 described above may not require aggregation to occur on the server side, or be based on characteristic information received from a number of users. Instead, the aggregation may occur within the tracker application 116, based on a number of instances of characteristic information, pertaining to one or more items of content, received from a single user or a group of users having access to a single device. The received (or retrieved) aggregate information pertaining to the content may accordingly be generated by aggregating multiple instances of characteristic information received from the single user (for a group of users (e.g., a family, household, or organisation) that may have access to a media player device 106. In this example case, the method 500 may include retrieving aggregate characteristic information pertaining to content that has been locally generated (e.g., generated within the context of the media player device 106), and that has been generated using a number of instances of characteristic information received directly by the media player device 106. The aggregate characteristic information may then be presented to a user to assist the user in navigation of the content. In this example embodiment, the aggregation module 128 may form part of the tracker application 116, and the aggregated selected portion table 134 may be stored within the memory 108 associated with the media player device 106.

Figure 6:
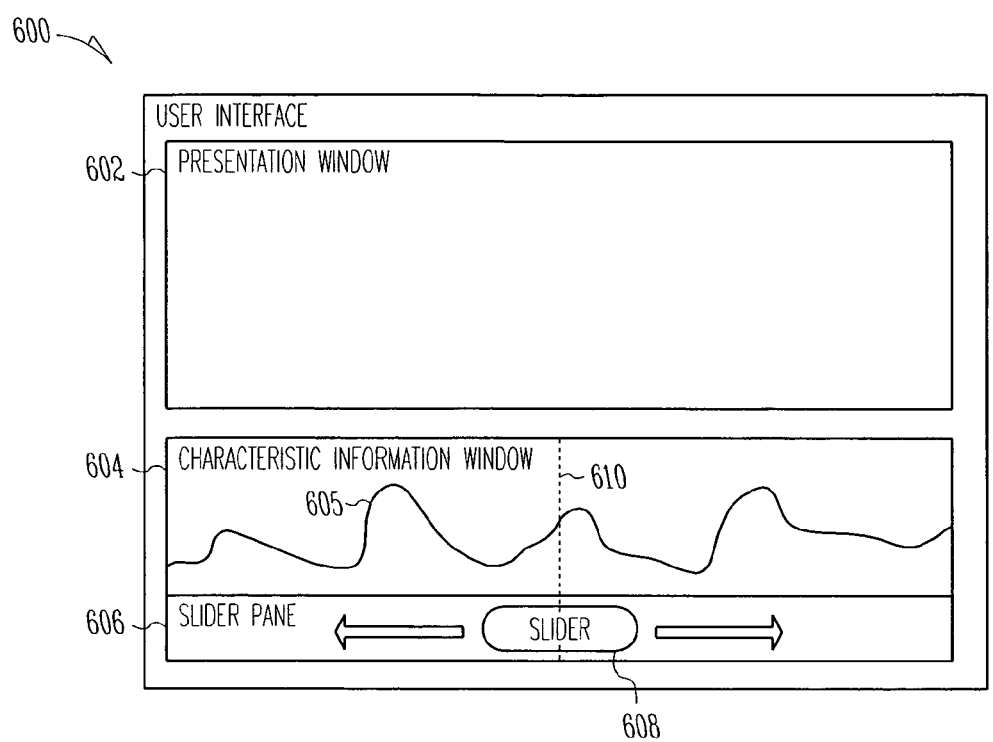
FIG. 6 is a user interface diagram illustrating a user interface that may be generated by a tracker application and/or a player application, according to an example embodiment.

FIG. 6 is a user interface diagram illustrating a user interface 600 that may be generated by the tracker application 116 and/or the player application 112 utilizing an interface module (not shown) that may be integrated within either one of the applications 116 or 112. The user interface 600 includes a presentation window 602 within which a digital content item may be presented to a user. For example, where the digital content item is a digital video, playback of the relevant video may be presented within the presentation window 602. Similarly, where the digital content item is a digital picture or image, the image may be displayed within the presentation window 602. In the case of audio content, a graphical representation of time progression associated with an audio presentation of the audio content may be displayed. For a digital document, the digital document may be presented within the presentation window 602.

The user interface 600 also includes a characteristic window 604, within which the aggregate characteristic information (e.g., received at operation 512 in the method 500) may be displayed in a manner to enhance the presentation of content in the presentation window 602 and, in an example embodiment, to facilitate navigation of the displayed content. In the example shown in FIG. 6, the characteristic window 604 is shown to display aggregate characteristic information in the form of graph plotting a count of favorite indications received with respect to a digital video against individual frames (or collections of frames) of the digital video. Specifically, the "favorite" characteristic information is displayed as a count (Y-axis) against a frame number (X-axis). Accordingly, the peaks of the graph represent what are portions (e.g., frames or collections of frames) of the video that received the largest number of counts as "favorite" frames.

A slider pane 606 includes a graphical slider icon 608 that is associated with a vertical axis (or line) that is movable relative to the graph 604 so as to locate playback of a digital video at a particular frame. A user, by moving the slider icon 608 horizontally within the slider pane 606, can advance or retreat playback to a particular portion of the video. Accordingly, a user, wishing to view portions of the video that are identified by the aggregate characteristic information as being popular favorite portions, can conveniently navigate to these portions by directing horizontal movement of the slider icon 608.

The presentation of digital content items may be enhanced in any number of ways utilizing the characteristic information. For example, the playback of an audio file could be enhanced, in a manner similar to that described above with reference to FIG. 6, to show certain user-identified characteristics of an audio file. For example, where the audio file is a speech or presentation spanning a number of hours, a user may elect to hear (e.g., tag or flag) certain portions of the audio file that have been tagged as having a certain characteristic (e.g., being a favorite, relating to certain user-specified content, speech by a particular speaker etc). With respect to a digital image (e.g., digital photograph or a digital map), the presentation of the digital image may be enhanced to highlight or display certain user-identified characteristics with respect to the digital image. For example, icons may be overlaid on the display of the image, or a coloring scheme may be superimposed on the image to identify the aggregate characteristic information.

With respect to a digital document, a graphical representation of characteristics, plotted against page numbers, paragraphs numbers or line numbers, may be displayed so as to enable user navigation to a particular portion of the digital document identified by aggregate characteristic information as exhibiting a specific characteristic. For example, a portion of a lengthy text document that exhibits the characteristic of being potentially of interest to a certain demographic of user may be highlighted in this manner, and convenient user navigation to a relevant portion may be facilitated.

Figure 7:
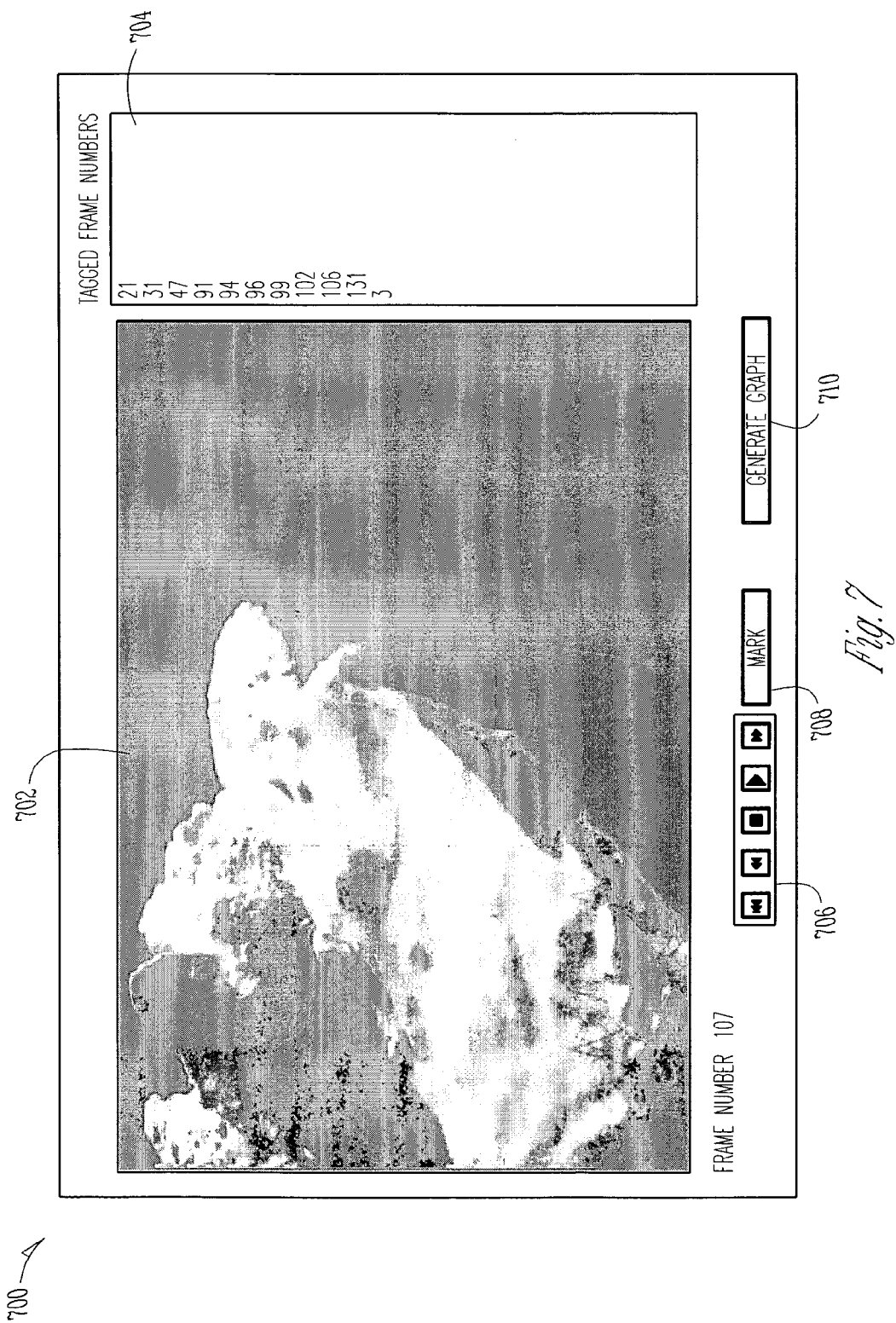
FIGS. 7-8 are screenshots of a user interface generated by an example video player and tracker application that receives characteristic information from a user, pertaining to a video that is played back by the relevant application.
Figure 8:
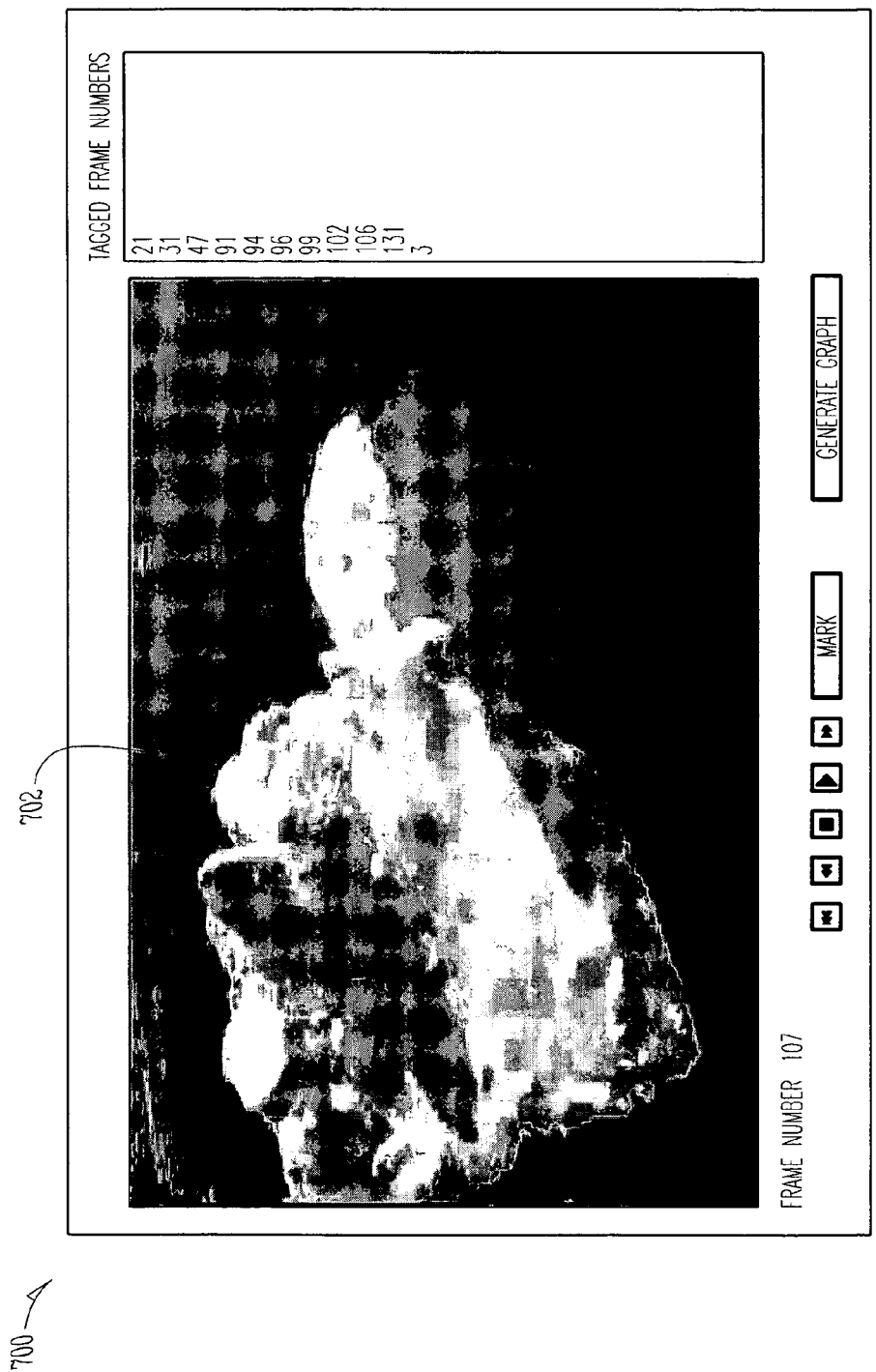

FIGS. 7-8 are screenshots of a user interface generated by an example video player and tracker application that receives characteristic information from a user, pertaining to a video that is played back by the application. Specifically, the example interface 700 includes a playback window 702 within which a video may be displayed. The interface 700 also includes a frame tagging window 704, within which frames identified (or selected) by a user as having a particular characteristic (e.g., being "favorite" frames) are shown. The interface 700 also includes a number of playback controls 706 (e.g., rewind, fast forward buttons), as well a mark (or tag) button 708 that is user selectable, during playback of a video within the playback window 702, to flag a frame of the video as having a particular characteristic. Accordingly, during playback of a video, user selection of the mark button 708 will cause a particular frame to be flagged or tagged, and the relevant frame number to be displayed within the window 704. FIG. 7 illustrates a number of tagged frame numbers as being displayed within the window 704.

The interface 700 also includes a "generate graph" button 710 that is user selectable to enhance presentation of a video within the window 702 with user-generated characteristic information. Specifically, referring to FIG. 8, a screenshot of the interface 700 shows the superimposed display of a graph 712 within the presentation window 702. The graph is based on a count of marking or "tagging" events received with respect to the relevant video over a sequence of frames. In other words, the sequence of frame numbers is represented by the X-axis, with a count of the number of "marks" or "tags" received with respect to each frame being plotted on the Y-axis. Accordingly, the graph provides an enhancement to the presentation of the content, and may allow a user conveniently to navigate to a portion of the content identified, by a human user, as exhibiting a specific characteristic.

Figure 9:
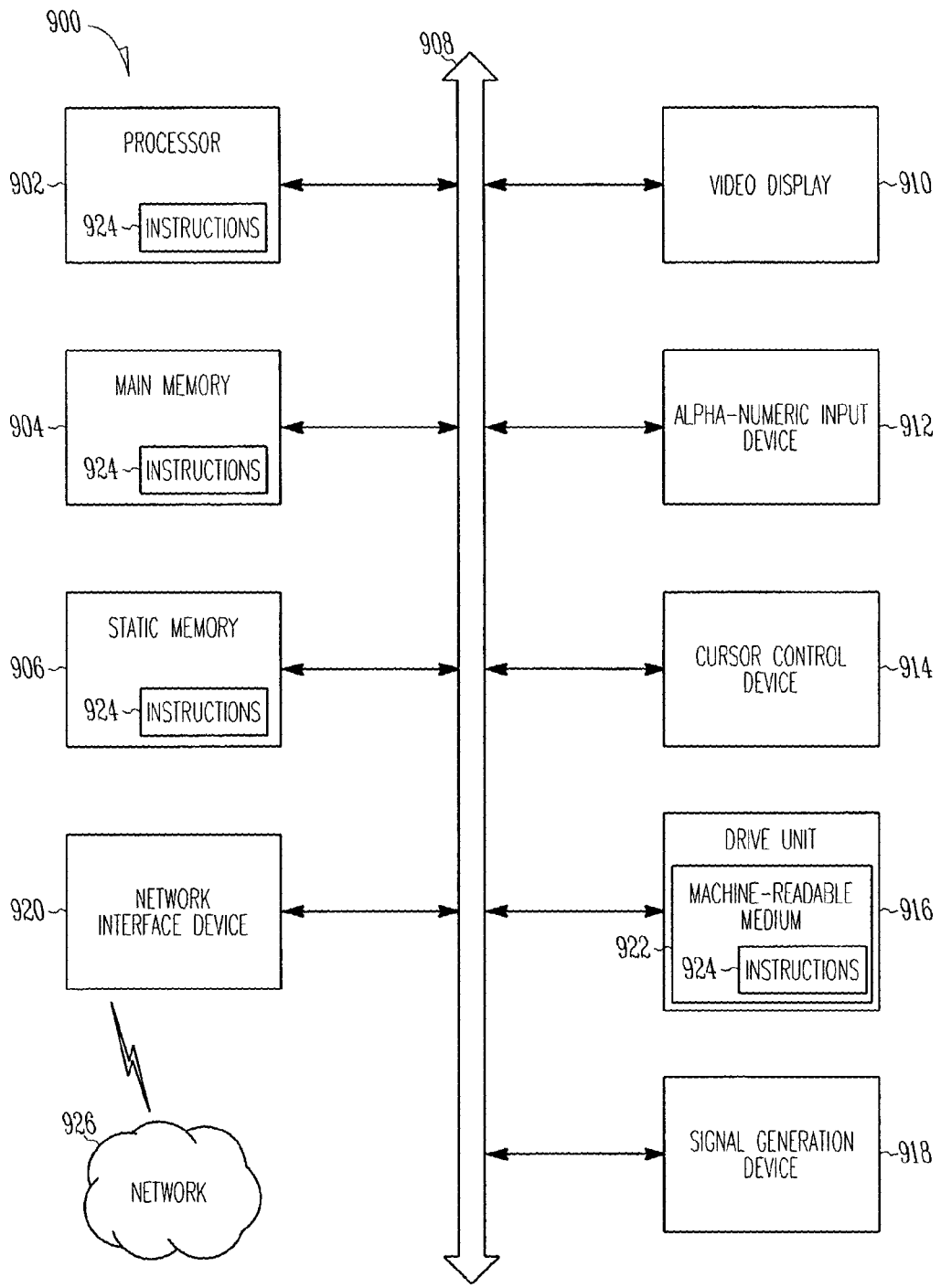
FIG. 9 is a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving user-generated information that identifies a portion of digital content as being designated by a user and as being exhibitory of a user-perceivable characteristic perceived in the portion by the user;
identifying the digital content based on the received user-generated information, the digital content including the portion identified as being designated by the user and as being exhibitory of the user-perceivable characteristic;
accessing an aggregate of user-generated information received from a plurality of users, the aggregate corresponding to the identified digital content and indicating a plurality of portions of the digital content as being exhibitory of the user-perceivable characteristic perceived in the plurality of portions by the plurality of users; and
updating the aggregate with the received user-generated information, the updating of the aggregate being performed using a processor of a machine.

2. The method of claim 1, wherein:
the digital content includes at least one of video data, audio data, image data, or document data; and
the portion of the digital content includes at least one of a video frame, an audio time sequence number, a plurality of pixels, or document text.

3. The method of claim 1, wherein:
the user-generated information includes a characteristic identifier that identifies the user-perceivable characteristic perceived in the portion of the digital content by the user.

4. The method of claim 3, wherein:
the characteristic identifier is selected from a group consisting of: favorite, violence, and action.

5. The method of claim 1, wherein:
the user-generated information includes a degree identifier that identifies a degree to which the user-perceivable characteristic was perceived in the portion of the digital content by the user.

6. The method of claim 5, wherein:
the degree identifier is a numerical value.

7. The method of claim 1, wherein:
the updating of the aggregate includes incrementing a count that corresponds to the portion of the digital content and that indicates a size of the plurality of users.

8. The method of claim 1, wherein:
the updating of the aggregate includes incrementing a count that corresponds to the user-perceivable characteristic and that indicates a size of the plurality of users.

9. The method of claim 1 further comprising:
communicating at least some of the aggregate to a media player device configured to generate a presentation of the digital content based on the at least some of the aggregate communicated.

10. The method of claim 9 further comprising:
receiving a request for the at least some of the aggregate from the media player device; and wherein the communicating of the at least some of the aggregate is responsive to the receiving of the request.

11. The method of claim 10, wherein:
the request includes a demographic criterion that specifies the at least some of the aggregate; and the method further comprises
identifying the at least some of the aggregate based on the demographic criterion.

12. The method of claim 11, wherein:
the demographic criterion is at least one of: a gender, an age, or an age range.

13. A method comprising:
accessing an aggregate of user-generated information that corresponds to digital content, the aggregate identifying a plurality of portions of the digital content as being designated by a plurality of users and as being exhibitory of a user-perceivable characteristic perceived by the plurality of users;
generating a presentation of the digital content based on the aggregate, the presentation of the digital content including the plurality of portions and being navigable using at least some of the aggregate, the generating of the presentation being performed using a processor of a machine;
receiving a navigation input generated by a user and indicative of a portion of the digital content selected by the user from the plurality of portions of the digital content; and
presenting the selected portion of the digital content in response to the navigation input.

14. The method of claim 13 further comprising:
requesting the aggregate of user-generated information from a server; and
receiving the aggregate.

15. The system of claim 13 further comprising:
receiving further user-generated information that corresponds to the digital content, the user-generated information identifying the portion of the digital content as being designated by a user of the plurality of users and as being exhibitory of the user-perceivable characteristic perceived in the portion by the user; and
incorporating the further user-generated information into the aggregate.

16. The method of claim 13, wherein:
the navigation input includes a position of a graphical slider icon.

17. The method of claim 13, wherein:
the presentation of the digital content includes a graph generated based on the aggregate.

18. A system comprising:
an input module to receive user-generated information that identifies a portion of digital content as being designated by a user and as being exhibitory of a user-perceivable characteristic perceived in the portion by the user; and
an aggregation module implemented using a processor of a machine, the aggregation module to:
identify the digital content based on the received user-generated information, the digital content including the portion identified as being designated by the user and as being exhibitory of the user-perceivable characteristic;
access an aggregate of user-generated information received from a plurality of users, the aggregate corresponding to the identified digital content and indicating a plurality of portions of the digital content as being exhibitory of the user-perceivable characteristic perceived in the plurality of portions by the plurality of users; and
update the aggregate with the received user-generated information.

19. A system comprising:
a tracker module implemented using a processor of a machine, the tracker module to:
access an aggregate of user-generated information that corresponds to digital content, the aggregate identifying a plurality of portions of the digital content as being designated by a plurality of users and as being exhibitory of a user-perceivable characteristic perceived by the plurality of users; and generate a presentation of the digital content based on the aggregate, the presentation of the digital content including the plurality of portions and being navigable using at least some of the aggregate;

an input interface to receive a navigation input generated by a user and indicative of a portion of the digital content selected by the user from the plurality of portions of the digital content; and a player module to present the selected portion of the digital content in response to the navigation input.

20. A non-transitory machine-readable storage medium comprising instructions that, when executed by one or more processors of a machine, cause the machine to perform operations comprising:

receiving user-generated information that identifies a portion of digital content as being designated by a user and as being exhibitory of a user-perceivable characteristic perceived in the portion by the user;

identifying the digital content based on the received user-generated information, the digital content including the portion identified as being designated by the user and as being exhibitory of the user-perceivable characteristic;

accessing an aggregate of user-generated information received from a plurality of users, the aggregate corresponding to the identified digital content and indicating a plurality of portions of the digital content as being exhibitory of the user-perceivable characteristic perceived in the plurality of portions by the plurality of users; and updating the aggregate with the received user-generated information.

21. A non-transitory machine-readable storage medium comprising instructions that, when executed by one or more processors of a machine, cause the machine to perform operations comprising:

accessing an aggregate of user-generated information that corresponds to digital content, the aggregate identifying a plurality of portions of the digital content as being designated by a plurality of users and as being exhibitory of a user-perceivable characteristic perceived by the plurality of users;

generating a presentation of the digital content based on the aggregate, the presentation of the digital content including the plurality of portions and being navigable using at least some of the aggregate;

receiving a navigation input generated by a user and indicative of a portion of the digital content selected by the user from the plurality of portions of the digital content; and presenting the selected portion of the digital content in response to the navigation input.

* * * * *